United States Patent
Balmer et al.

(10) Patent No.: US 9,540,528 B2
(45) Date of Patent: Jan. 10, 2017

(54) ENERGY-CURABLE NEWS INK CONTAINING SOY OIL

(75) Inventors: Rodney P Balmer, Ann Arbor, MI (US); Michael P Hazell, Ypsilanti, MI (US); Thomas R Mawby, Ypsilanti, MI (US)

(73) Assignee: Flint Group US LLC, Plymouth, MI (US)

( * ) Notice: Subject to any disclaimer, the term of this patent is extended or adjusted under 35 U.S.C. 154(b) by 1281 days.

(21) Appl. No.: 12/509,694

(22) Filed: Jul. 27, 2009

(65) Prior Publication Data

US 2009/0283001 A1    Nov. 19, 2009

Related U.S. Application Data

(62) Division of application No. 10/961,596, filed on Oct. 8, 2004.

(51) Int. Cl.
 C09D 11/02    (2014.01)
 B41M 5/00    (2006.01)
 C09D 11/101    (2014.01)

(52) U.S. Cl.
 CPC ............ C09D 11/101 (2013.01); *Y10S 101/49* (2013.01)

(58) Field of Classification Search
 CPC .............................. C09D 11/101; Y10S 101/49
 USPC ..................... 522/42, 44, 64, 182; 430/286.1
 See application file for complete search history.

(56) References Cited

U.S. PATENT DOCUMENTS

| | | |
|---|---|---|
| 3,673,140 A | 6/1972 | Ackerman et al. |
| 3,950,650 A | 4/1976 | Pray et al. |
| 4,231,742 A | 11/1980 | Clausen et al. |
| 4,233,130 A | 11/1980 | Borden et al. |
| 5,173,113 A | 12/1992 | Sugerman et al. |
| 5,354,366 A | 10/1994 | Pennaz et al. |
| 5,376,237 A | 12/1994 | Ishiguro et al. |
| 5,570,636 A | 11/1996 | Lewis et al. |
| 5,912,106 A * | 6/1999 | Chang et al. ............... 430/281.1 |
| 6,240,230 B1 * | 5/2001 | Szum ............................. 385/100 |
| 6,284,816 B1 | 9/2001 | Laksin et al. |
| 6,291,540 B1 | 9/2001 | Priou et al. |
| 6,316,517 B1 | 11/2001 | Dones et al. |
| 6,382,092 B1 | 5/2002 | Van Den Brink et al. |
| 6,427,597 B1 | 8/2002 | Aurenty et al. |
| 6,686,487 B2 | 2/2004 | Franks |
| 6,727,295 B2 | 4/2004 | Laksin et al. |
| 7,910,680 B2 * | 3/2011 | White et al. ................... 527/312 |
| 2001/0009706 A1 | 7/2001 | Meyer |
| 2002/0102077 A1 * | 8/2002 | Szum et al. ................... 385/100 |
| 2003/0036019 A1 | 2/2003 | Teng |
| 2010/0196674 A1 * | 8/2010 | Vanderlip et al. .......... 428/195.1 |

FOREIGN PATENT DOCUMENTS

| | | |
|---|---|---|
| EP | 0 542 219 A | 5/1993 |
| EP | 0973808 B1 | 4/1998 |

* cited by examiner

*Primary Examiner* — Irina S Zemel
(74) *Attorney, Agent, or Firm* — Honigman Miller Schwartz and Cohn LLP

(57) ABSTRACT

An energy curable ink composition comprising an acrylate-functional derivative of soybean oil and one or more further acrylate-functional materials is suitable for printing on a cold-set lithographic press and is cured by exposure to an actinic radiation source located on the press.

7 Claims, No Drawings

ENERGY-CURABLE NEWS INK CONTAINING SOY OIL

CROSS-REFERENCE TO RELATED APPLICATION

This application is a divisional of U.S. patent application Ser. No. 10/961,596 filed on Oct. 8, 2004.

FIELD OF THE INVENTION

The invention relates to energy-curing ink compositions and methods.

BACKGROUND OF THE INVENTION

Newspapers are predominantly printed lithographically with cold-set inks that set by penetration into the absorbent paper stock. Printer who print daily newspapers may devote considerable press time to it, but those printer who print newspapers for smaller towns and cities that publish only weekly or bi-weekly may find considerable downtime. The presses represent a costly investment, and it is desirable to have enough jobs to fill available time. Consequently, printers may seek other jobs such as insert material, covers, and color advertisements. Many of these print jobs, however, require heatset equipment to print on coated stock for printed materials with better gloss or better print definition. The cold-set process is capable of printing only on uncoated (thus absorbent) stock.

Modifying the press to print heatset inks would require significant additional equipment to be added, particularly ovens and solvent reclaim or incineration equipment. This would add a lot of expense and require a lot of additional space. Further, the heatset inks would need to be compatible with the rollers and blankets of the press, which are rubber materials.

SUMMARY OF THE INVENTION

The present invention provides an energy curable ink composition including an acrylate-functional derivative of soybean oil and one or more further acrylate-functional materials. In various embodiments, the composition has a soy content of at least about 7% by weight of soy. The ink compositions may be cured by electron beam radiation or, if photoinitiators are further included in the inks, by ultraviolet (UV) radiation. the ink of the invention uses a naturally occurring material, soybean oil from a sustainable source. The ink provides improved characteristics, particularly excellent color strength mileage, ink/water balance, and smoothness.

The invention also provides a method of printing with a lithographic printing press, wherein a cold-set ink is printed on an absorbent substrate and, subsequently, an energy curable ink composition including an acrylate-functional derivative of soybean oil and one or more acrylate-functional oligomers is printed onto a nonabsorbent or semi-absorbent substrate and then cured with actinic radiation. The actinic radiation may be electron beam radiation or, if a photoinitiator is included in the energy curable ink composition, ultraviolet radiation. In various embodiments, the oligomers may be selected from polyester acrylates, polyurethane acrylates, epoxy acrylates, and combinations of these.

The invention also provides a newspaper cold-set lithographic press equipped with a source of actinic radiation, particularly an electron beam radiation source or an ultraviolet light radiation source. The press is suitable for printing an energy curable ink composition including an acrylate-functional derivative of soybean oil and one or more acrylate-functional oligomers "A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

DETAILED DESCRIPTION OF THE PREFERRED EMBODIMENTS

The following description of the preferred embodiment(s) is merely exemplary in nature and is in no way intended to limit the invention, its application, or uses.

The energy curable ink composition includes an acrylate-functional derivative of soybean oil ("soy acrylate") and one or more further acrylate-functional materials. In various embodiments, the ink composition includes preferably at least about 7% by weight of the soy acrylate, more preferably at least about 8% by weight of the soy acrylate, and still more preferably at least about 9% by weight of the soy acrylate. The ink composition includes preferably up to about 12% by weight of the soy acrylate, more preferably up to about 10% by weight of the soy acrylate.

An acrylate-functional derivative of soybean oil may be prepared by various means by adducting soybean oil components with functionality reactive with acrylic acid or a functional derivative of acrylic acid. In a preferred embodiment, epoxidized soybean oil is reacted with acrylic acid to provide the beta-hydroxy acrylate ester, known as epoxidized soybean oil acrylate. Epoxidized soybean oil and its acrylate are both commercially available. Preparation of acrylated fatty oils such as soybean oil is described in Hodakowski et al., U.S. Pat. No. 4,119,640, which is incorporated herein by reference. Other methods of synthesizing acrylate-functional soybean oil derivatives, such as be transesterification with acrylic acid or by reaction of epoxidized soybean oil with t-butylaminoethyl acrylate, are also feasible.

In addition to the soy acrylate, the energy-curable lithographic inks of the invention also include one or more other acrylate-functional materials, which may be acrylate monomers and/or oligomers. Preferably, the inks include at least one or more acrylate oligomer. The acrylate monomers and oligomers should be selected and apportioned to provide a suitable viscosity for lithographic printing. In general, acrylate materials are preferred over methacrylate or vinyl materials because the acrylate materials have faster cure rates, although the compositions may include methacrylate- and/or vinyl-functional monomers as well.

The monomer or monomers in the ink composition may be monoethylenically functional or polyethylenically functional, and preferably difunctional, trifunctional, and/or tetrafunctional monomers are included. Suitable examples of acrylate monomers include, without limitation, neopentylglycol diacrylate, pentaerythritol tetracrylate, trimethylolpropane triacrylate, hexanediol diacrylate, isobornyl acrylate, bisphenol A epoxy diacrylate, triethyleneglycol diacrylate, ethoxylated bisphenol-A diacrylate, tripropyleneglycol diacrylate, ethoxylated hexanediol diacrylate, propoxylated glyceryl triacrylate, and so on. These may be used in any combination.

Suitable examples of acrylate oligomers include, without limitation, polyester acrylates, polyether acrylates, epoxy acrylates, and urethane acrylates. Such oligomers are well-known and described in detail in many references. Many are commercially available. In general, acrylate-functional oligomers may be formed by preparing an compound or oligomeric material having one or more functional groups reactive with an acrylate monomer, such as with acrylic acid. Acrylate oligomers typically have a number average molecular weight of from 500 to 5000.

Polyester acrylates may be prepared, for example, by synthesis of a polyester oligomer using acrylic acid and/or hydroxyalkyl esters of acrylic acid as reactant. Preferably, however, polyester acrylates are prepared by acrylating hydroxyl-functional polyesters. Unreacted acrylic acid may be removed from the product by washing, distilling, or, preferably, by reacting with an equivalent amount of a monoepoxide or diepoxide compound using appropriate catalysts, such as triphenylphosphine, for example.

Polyether acrylates may be prepared by esterifying hydroxyl-functional polyethers with acrylic acid. Hydroxy-functional polyethers may be prepared by reacting dihydric and/or higher polyhydric alcohols with desired amounts of ethylene oxide and/or propylene oxide in accordance with well-known methods. It is also possible to use polymerization products of tetrahydrofuran or butylene oxide.

Epoxy acrylates may be prepared by subjecting acrylic acid to addition reaction with epoxy resins, for example, with epoxy resins based on bisphenol A.

Polyurethane acrylates may be obtained by reacting a diisocyanate or polyisocyanate with one or more chain extenders from the group of diols, polyols, diamines, polyamines (which would provide urea groups), and/or alkanolamines, and then reacting some or all of the remaining free isocyanate groups with at least one hydroxyalkyl acrylate or aminoalkyl acrylate. Another possibility is to prepare the polyurethane acrylates by first reacting some of the isocyanate groups of a diisocyanate or polyisocyanate with at least one hydroxyalkyl acrylate and then to react the remaining isocyanate groups with a chain extender.

The ink may contain further ethylenically unsaturated reactants, such as methacrylate monomers and oligomers and vinyl monomers and oligomers. If included, these further materials are generally used in small amounts due their lower reactivity.

The ink will contain one or more pigments to provide a desired color. Suitable pigments include, without limitation, inorganic pigments such as carbon black, titanium dioxide, black iron oxide, and so on; and organic pigments such as azo pigments such as lithol reds (e.g., calcium lithol red, barium lithol red), rubine reds, and naphthol reds, oranges, and browns; monoarylide and diarylide pigments such as diarylide yellow, phthalocyanine blue and green pigments, azomethine pigments, methine pigments, anthraquinone pigments, perinone pigments, perylene pigments, diketopyrrolopyrrole pigments, thioindigo pigments, iminoisoindoline pigments, iminoisoindolinone pigments, quinacridone pigments such as quinacridone reds and violets, flavanthrone pigments, indanthrone pigments, anthrapyrimidine pigments, carbazole pigments such as carbazole violet, benzimidazolone yellows, tolyl orange, naphthol orange, and quinophthalone pigments, and so on. The pigments may be used singly or in any combination.

The ink may contain any desired additives known in the art. Illustrative examples of other additives include, without limitation, surfactants, wetting agents, waxes, emulsifying agents and dispersing agents, antioxidants, flow agents and other rheology modifiers, gloss enhancers, and anti-settling agents. When included, additives are typically included in amounts of at least about 0.001% of the ink composition, and may be included in amount of about 7% by weight or more of the ink composition.

The applied ink is cured with actinic radiation. If photoinitiators are further included in the inks, the inks may be cured by ultraviolet (UV) radiation. Various UV light sources, including iron oxide or gallium or valadium doped mercury lamps and xenon chloride lamps, are available. Electron beam sources are also preferred.

Examples of suitable photoinitiators include, without limitation, benzophenone, benzophenone derivatives, acetophenone, acetophenone derivatives, for example 1-hydroxy-cyclohexyl-phenyl ketone, 1-[4-(2-hydroxyethoxy)-phenyl]-2-hydroxy-2-methyl-1-propan-1-one or 2-hydroxy-2-methyl-1-phenyl-propanone, dialkoxyacetophenones, .alpha.-hydroxy- or .alpha.-amino-acetophenones, for example (4-morpholino-benzoyl)-1-benzyl-1-di-methyl-amino-propane or (4-methylthiobenzoyl)-1-methyl-1-morpholino-ethane, 4-aroyl-1,3-dioxolanes, benzoin alkyl ethers and benzil ketals, for example 2,2-dimethoxy-1,2-diphenylethan-1-one, monoacylphosphine oxides, for example 2,4,6-trimethylbenzoyl-diphenyl-phosphine oxide, bisacylphosphine oxides, for example bis(2,6-dimethoxybenzoyl)-2,4,4-trimethylpentyl-phosphine oxide, bis(2,4,6-trimethylbenzoyl)-(2-methylprop-1-yl)-phosphine oxide, bis(2,4,6-trimethylbenzoyl)phenyl-phosphine oxide and tri-sacylphosphine oxides. In certain cases it may be advantageous to use mixtures of two or more photoinitiators, for example mixtures of bis(2,6-dimethoxybenzoyl)-2,4,4-trimethylpentyl-phosphine oxide or bis(2,4,6-trimethylbenzoyl)-phenyl-phosphine oxide with 1-hydroxy-cyclohexyl-phenyl ketone or hydroxy-2-methyl-1-phenyl-propanone or 2-methoxy-1-phenyl-ethane-1,2dione, and thioxanphones. The photoinitiator or photoinitiators may be included in amounts of from about 4 percent to about 20 percent by weight, preferably from about 5 percent to about 10 percent by weight in the ink.

When the energy curable inks are cured by ultraviolet radiation, it is possible to shorten the curing time by adding a photosensitizer, such as benzoin, benzoin methyl ether, benzoin ethyl ether, benzoin isopropyl ether, benzil (dibenzoyl), diphenyl disulfide, tetrame-thyl thiuram-monosulfide, diacetyl, azobisisobutyronitrile, 2-methyl-anthraquinone, 2-ethyl-anthraquinone or 2-tertbutyl-anthraquinone, along with the photoinitiator or photoinitiators. A photosensitizer may be included preferably at most 5% by weight based on the weight of the composition.

The inks of the invention are lithographically printed onto a substrate, preferably using a cold-set lithographic press augmented with an actinic radiation source for curing the inks. Suitable substrates include, for examples, coated and uncoated papers. Thus, the press may be used to print a cold-set print job, such as printing a newspaper with news ink, and then be used to print a coated stock using the energy-curable, soy-containing ink of the invention. The actinic radiation source(s) for curing the ink is a fairly inexpensive, compact addition to the press. In various preferred embodiments, at least one UV lamp is installed in a position to cure the energy-curable ink after it is printed on the substrate. Preferably, at least one actinic radiation source (preferably a UV lamp) is installed on each side of the web.

The invention is illustrated by the following examples. The examples are merely illustrative and do not in any way limit the scope of the invention as described and claimed. All parts are parts by weight unless otherwise noted.

EXAMPLE

An energy-curable ink is prepared by combining 7 parts by weight of a photoinitiator, 25 parts by weight of a combination of isobornyl acrylate and trimethylolpropane triacrylate, 25 parts by weight of a polyester acrylate, 15 parts by weight of a bisphenol A-type epoxy acrylate, 8 parts by weight of the acrylate ester of epoxidized soybean oil, 18 parts by weight carbon black, 5 parts by weight of a urethane acrylate, and 5 parts by weight of a combination of UV ink additives.

A cold-set lithographic press equipped with an ultraviolet radiation lamp is used to print a newspaper run. After the printing is completed, the news ink in the ink fountain is replaced by the energy-curable ink. An insert is then printed on coated paper with the energy-curable ink. The printed ink is cured with ultraviolet radiation from the lamp. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An energy curable ink composition comprising from about 7% by weight to about 12% by weight of an acrylate-functional derivative of soybean oil, one or more further acrylate-functional materials, and a pigment; wherein the ink composition is a lithographic ink compatible with printing on a cold-set lithographic press.

2. An energy curable ink composition according to claim 1, wherein the acrylate-functional derivative of soybean oil comprises epoxidized soybean oil acrylate.

3. An energy curable ink composition according to claim 1, wherein the one or more further acrylate-functional materials comprise an acrylate oligomer selected from the group consisting of polyester acrylates, polyether acrylates, epoxy acrylates, urethane acrylates, and combinations thereof.

4. An energy curable ink composition according to claim 1, comprising from about 7% by weight to about 10% by weight of the acrylate-functional derivative of soybean oil.

5. An energy curable ink composition according to claim 4, wherein the one or more further acrylate-functional materials comprise an acrylate oligomer selected from the group consisting of polyester acrylates, polyether acrylates, epoxy acrylates, urethane acrylates, and combinations thereof.

6. An energy curable ink composition according to claim 1, comprising from about 5% by weight to about 10% by weight photoinitiator.

7. An energy curable ink composition according to claim 6, wherein the one or more further acrylate-functional materials comprise isobornyl acrylate, trimethylolpropane triacrylate, polyester acrylate, urethane acrylate, and epoxy acrylate.

* * * * *